(12) United States Patent
Kunsky

(10) Patent No.: US 11,059,108 B1
(45) Date of Patent: Jul. 13, 2021

(54) SOLVENT TRAP TOOL

(71) Applicant: Jacob Kunsky, Bruneau, ID (US)

(72) Inventor: Jacob Kunsky, Bruneau, ID (US)

(*) Notice: Subject to any disclaimer, the term of this patent is extended or adjusted under 35 U.S.C. 154(b) by 0 days.

(21) Appl. No.: 16/722,833

(22) Filed: Dec. 20, 2019

(51) Int. Cl.
| | |
|---|---|
| *B23B 49/02* | (2006.01) |
| *F41A 21/30* | (2006.01) |
| *F41A 29/00* | (2006.01) |
| *B23B 35/00* | (2006.01) |

(52) U.S. Cl.
CPC ............. *B23B 49/02* (2013.01); *F41A 21/30* (2013.01); *B23B 35/00* (2013.01); *B23B 2215/28* (2013.01); *F41A 29/00* (2013.01)

(58) Field of Classification Search
CPC ....... B23B 49/00; B23B 49/02; B23B 49/023; B23B 47/281; B23B 2247/08; B23B 2247/12; B23B 2215/28; B23B 35/00; F41A 21/30; F41A 21/32; F41A 21/325; F41A 29/00; Y10T 408/03; Y10T 408/569
See application file for complete search history.

(56) References Cited

U.S. PATENT DOCUMENTS

| | | | | |
|---|---|---|---|---|
| 3,199,380 | A * | 8/1965 | Threlkeld | ............. B23B 47/281 |
| | | | | 408/72 R |
| 3,224,021 | A * | 12/1965 | Curran | .................... B23G 1/48 |
| | | | | 470/209 |
| 8,741,196 | B2 * | 6/2014 | McCracken | .......... B29C 70/545 |
| | | | | 264/163 |
| 10,119,779 | B1 * | 11/2018 | Miele | ...................... F41A 21/30 |
| 2020/0217606 | A1 * | 7/2020 | Wilson | .................. F41A 21/325 |

* cited by examiner

*Primary Examiner* — Eric A. Gates
*Assistant Examiner* — Chwen-Wei Su
(74) *Attorney, Agent, or Firm* — Parsons Behle & Latimer

(57) ABSTRACT

An apparatus and method to aid in providing a bore through a solvent trap that is both vertical and aligned with the centerline of the solvent trap. The apparatus includes a base, cap, and drill bushing. The base includes an exterior and a first central opening that forms an interior. The first central opening is configured to receive at least a portion of a solvent trap. The cap is configured to be secured to a portion of the solvent trap and includes the drill bushing positioned within a second central opening of the cap. The drill bushing includes a third central opening configured to align a drill bit along a centerline of the solvent trap. The third central opening may be configured to permit passage of various sizes of firearm rounds.

3 Claims, 10 Drawing Sheets

SOLVENT TRAP TOOL

BACKGROUND

Field of the Disclosure

The examples described herein relate to apparatus, systems, and methods of a tool to bore through a solvent trap.

Description of the Related Art

A firearm suppressor is a device mounted or otherwise attached to the muzzle of a firearm and, through selective use of baffles or gas-redirection means, operates to diminish the report (as measured in decibels) of a portable firearm following discharge. By reducing the report of a discharging firearm, suppressors reduce or mitigate hearing damage or loss otherwise resulting from repeated exposure to firearm discharges. Suppressors are regulated by the National Firearms Act of 1934 (the "NFA"). Under the Act, a statutory excise tax must be paid before a suppressor may be transferred from a licensed firearms dealer to a customer/end user. The federal government, Department of Justice, issues a so-called "tax stamp" as evidence that the excise tax has been paid as to a particular suppressor, and the issuance of the tax stamp is the event that allows the transfer from dealer to user to occur.

To complete lawful purchase of a suppressor sold by a licensed firearms dealer, a potential owner must pay for suppressor, complete a government Form 4, and pay the required fee for a NFA tax stamp. Even after the purchaser has paid for the suppressor, the suppressor remains with the firearms dealer until receipt of approval, which can take several months or even longer. This requirement to pay in advance for a suppressor followed by a lengthy period before the government issues the tax stamp and the purchaser obtains possession of the suppressor greatly inconveniences the sale of suppressors.

As discussed above, it often takes several months, if not longer, for the government to approve an application for possession of a suppressor purchased from a licensed firearms dealer. However, an individual who builds his own suppressor qualifies for different, and relatively accelerated treatment under the NFA. So-called "self-made" suppressors are suppressors made by an individual for her own use. While possession of these self-made suppressors still requires payment of the NFA excise tax and issuance of a tax stamp, the process for obtaining that tax stamp kicks off with the submission of a Form 1 (as opposed to a Form 4, noted above). The process associated with the submission of Form 1 is much shorter, with approval often occurring within weeks instead of months.

A solvent trap is a device that may be attached to the barrel of a firearm that traps or catches solvent and debris that exits the end of the barrel while cleaning the firearm. A solvent trap may be built with the same sort of baffles that, when utilized by a suppressor manufacturer, operate to suppress the report of a firearm. However, as the primary object of a solvent trap is to catch, or trap, fluids and debris during cleaning, it does not include a central bore, or hole, completely through the entire solvent trap. Solvent traps are not characterized as suppressors for this reason. Solvent traps may be converted into a suppressor by drilling a central bore through each baffle section of the solvent trap. Of course, this conversion of a solvent trap into a suppressor qualifies as the manufacture of a self-made suppressor, thereby triggering the obligations associated with NFA Form 1. The conversion may only occur after approval of Form 1, and receipt of the tax stamp for a self-made suppressor.

One potential difficulty in converting a solvent trap into a suppressor is making sure that the bore is drilled substantially vertically through the solvent trap. This difficulty may be overcome by using a drill press. However, some individuals may not have access to such devices. Another potential difficulty in converting a solvent trap into a suppressor is ensuring that the drilled bore is aligned with the centerline of the solvent trap. This can be difficult even if using a drill press. When using a hand-held drill it may be potentially difficult to drill a bore that is both substantially vertical as well as aligned with the centerline of the solvent trap. Other disadvantages may exist.

SUMMARY

The present disclosure is directed to apparatus, systems, and methods to aid in providing a bore through a solvent trap that is both vertical and aligned with the centerline of the solvent trap.

One example of the present disclosure is an apparatus comprising a base having an exterior and a first central opening that forms an interior, the first central opening configured to receive at least a first portion of a solvent trap. The apparatus includes a cap configured to be secured to a second portion of the solvent trap, the cap having a second central opening, wherein the second central opening is configured to align a drill bit along a centerline of a solvent trap. The apparatus may include a drill bushing positioned within the second central opening, the drill bushing having a third central opening and wherein the drill bushing is configured to align a drill bit along a centerline of the solvent trap.

The exterior of the base may be circular. The exterior of the base may include a first flat portion and a second flat portion opposite of the first flat portion. The apparatus may include a first set of threads on the interior of the base. The cap may include a first upper portion and a second lower portion, the first upper portion having a first perimeter and the second lower portion having a second perimeter that is smaller than the first perimeter. The first perimeter may include a plurality of tool engaging sections and the second perimeter may be circular. The second perimeter may include a second set of threads. The second set of threads may be configured to enable the cap to be threaded onto the second portion of the solvent trap.

The drill bushing may comprise a head and a project that extends from the head. The head may have a larger perimeter than the projection and the third central opening may extend through the head and the projection. The projection may have a first outer diameter and the third central opening may have a diameter configured to permit passage of a specified caliber round. For example, the first outer diameter may be, but is not limited to, 0.5 inches and the specified caliber round, may be, but is not limited to, a .22 caliber round, a 5.56 mm round, or a 6.5 mm round. The projection may have a second outer diameter that differs from the first outer diameter and the third central opening may have a diameter configured to permit passage of a specified caliber round. For example, the second outer diameter may be, but is not limited to, 0.75 inches and the specified caliber round, may be, but is not limited to, a .380 caliber round, a 9 mm round, a .40 caliber round, a .45 ACP caliber round, a 10 mm round, a .38 special round, a .357 magnum round, or a .50 caliber round.

One embodiment of the present disclosure is a method comprising providing a base having an exterior and a first central opening that forms an interior, the first central opening configured to receive at least a first portion of a solvent trap. The method includes providing a cap configured to be secured to a second portion of the solvent trap, the cap having a second central opening. The method includes providing drill bushing positioned within the second central opening, the drill bushing having a third central opening and wherein the drill bushing is configured to align a drill bit along a centerline of the solvent trap.

The method may include drilling a bore into an inner portion of the solvent trap via the drill bushing. The cap may be configured to accept differing sizes of drill bushings to enable different sizes of a bore to be drilled into the inner portion of the solvent trap. The method may include providing internal threads on the base and may include providing external threads on the cap. The exterior of the base may be circular. The method may include providing a first flat portion on the exterior of the base and providing a second flat portion on the exterior of the base, wherein the second flat portion is opposite of the first flat portion. The method may include providing a bore within the cap and providing a set screw, wherein the set screw may be inserted into the bore to retain the drill bushing within the second central opening of the cap.

One embodiment of the disclosure is a system for modifying a solvent trap. The system includes a base having an exterior and a first central opening that forms an interior, the first central opening configured to receive at least a first portion of a solvent trap. The system includes a first cap having a second central opening, wherein the second central opening is configured to align a drill bit along a centerline of the solvent trap. The system includes a second cap having an offset opening, wherein the offset opening is configured to align a drill bit offset of the centerline of the solvent trap to clip one or more baffles of the solvent trap. The system may include a drill bushing positioned within the second central opening, the drill bushing having a third central opening and wherein the drill bushing is configured to align a drill bit along the centerline of the solvent trap.

One embodiment of the disclosure is an apparatus for modifying baffles. The apparatus includes a base having an exterior and a first central opening that forms an interior, the first central opening configured to receive at least a first portion of a solvent trap. The apparatus includes one or more baffles aligned with the interior of the base and a cap having an offset opening. The offset opening is configured to align a drill bit offset of a centerline of the one or more baffles to clip one or more baffles.

Figure 1:
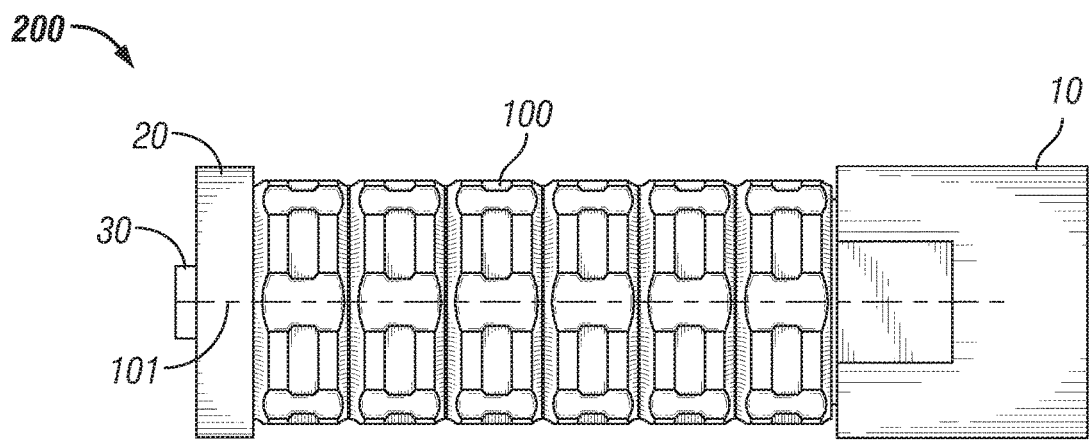
FIG. 1 is a schematic of an embodiment of apparatus connected to a solvent trap.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure as defined by the appended claims.

DETAILED DESCRIPTION

FIG. 1 shows a system 200 for converting a solvent trap 100 into a suppressor. The solvent trap 100 may include a plurality of baffles that may be used to suppress the report of a firearm, but the solvent trap 100 lacks a central bore that extends the length of the solvent trap 100 to permit the passage of a round discharged from a firearm. As discussed above, a drill may be used to provide such a bore, but it may be difficult to ensure that the bore is vertical and/or aligned with the centerline 101 of the solvent trap 100.

The system 200 includes a base 10 that is connected to one end, or a first portion, of the solvent trap 100 and a cap 20 connected to the opposite end, or a second portion, of the solvent trap 100. The base 10 may be threaded onto the end of the solvent trap 100. Alternatively, the end of the solvent trap 100 may be dropped or positioned within the base as would be appreciated by one of ordinary skill in the art having the benefit of this disclosure.

The cap 20 is threaded onto the end of the solvent trap 100. The cap 20 includes a drill bushing 30 that is positioned with a central opening of the cap 20. The drill bushing 30 and central opening may be configured so that the drill bushing 30 is a friction fit within the central opening. The drill bushing 30 is inserted and retained into the central opening. The cap 20 aligns the drill bushing 30 with the centerline 101 of the solvent trap 100. Thus, a drill bit may be inserted through the drill bushing 30 to drill a bore within the solvent trap 100 that is both vertical and aligned with the centerline 101 of the solvent trap 100.

Figure 2:
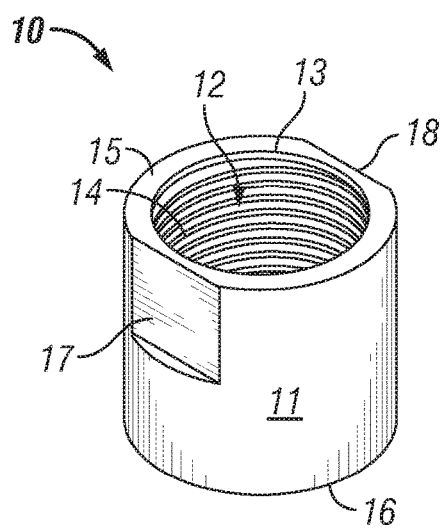
FIG. 2 is a schematic of an embodiment of a base.
Figure 3:
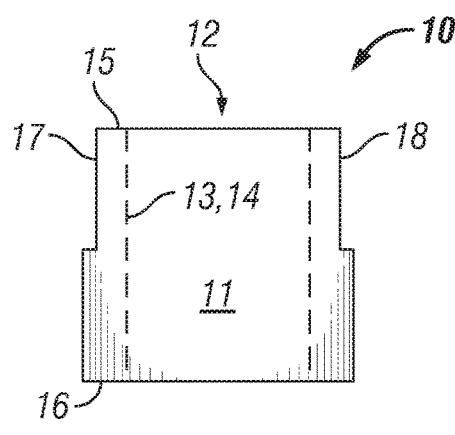
FIG. 3 is a schematic of an embodiment of a base.
Figure 4:
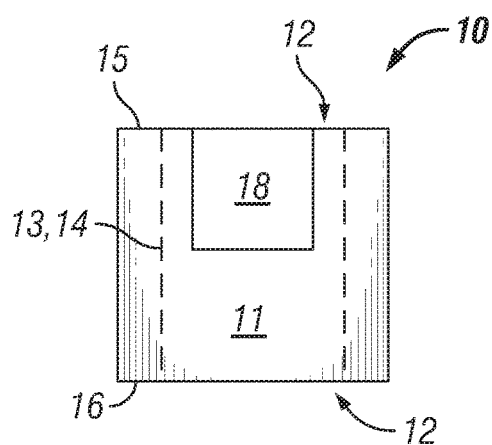
FIG. 4 is a schematic of an embodiment of a base.

FIGS. 2-4 show an embodiment of a base 10. The base 10 includes an exterior 11 and a first central opening 12 that extends from a first, or top, end 15 of the base 10 to a second, or bottom, end 16 of the base 10. The first central opening 12 forms an interior 13 of the base 10. The interior 13 of the base 10 may include a first set of threads 14, which may be used to connect the base to a portion of a solvent trap 100. Alternatively, an end of a solvent trap 100 may be simply positioned within the first central opening 12 of the base 10.

The exterior 11 of the base 10 may be circular to enable the base 10 to be positioned within a lathe, which may be used to drill a bore into solvent trap 100 via the drill bushing 30 as discussed herein. The exterior 11 of the base 10 may include a first flat portion 17 and a second flat portion 18 positioned opposite of the first flat portion 17. The first and second flat portions 17, 18 may enable the base 10 to be held by a tool, such as a clamp, to aid in the process or drilling a bore into the solvent trap 100.

Figure 5A:
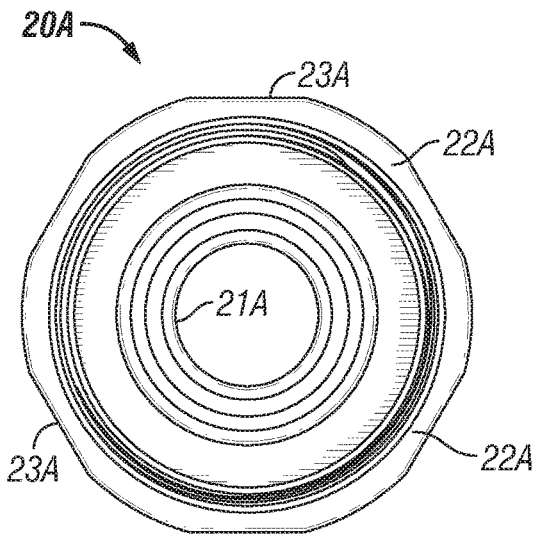
FIG. 5A is a schematic of an embodiment of a cap.
Figure 5B:
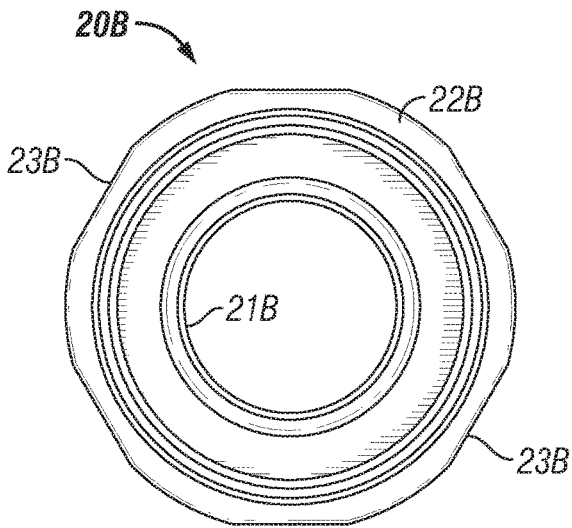
FIG. 5B is a schematic of an embodiment of a cap.
Figure 6:
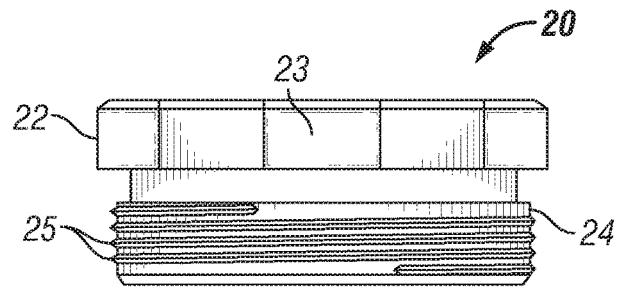
FIG. 6 is a schematic of an embodiment of a cap.

FIG. 6 shows an embodiment of a cap 20 having a head 22, a plurality of tool engaging sections 23 around the perimeter of the head 22, a projection 24 that extends from the head 22, and external threads 25 on the projection 24. The cap 20 includes a second central opening (best shown in FIGS. 5A and 5B). The second central opening 21 is configured to receive a drill bushing 30 as discussed herein. The second central opening 21 and the drill bushing 30 may be configured to provide a friction fit between the cap 20 and the drill bushing 30.

FIG. 5A shows one embodiment of a cap 20A and FIG. 5B shows an embodiment of a cap 20B having a larger second central opening 21B than the second central opening 21A of the embodiment of FIG. 5A. The cap 20A of FIG. 5A includes a second central opening 21A that extends through the cap 20A. The cap 20A includes a head 22A. The head 22A may include a plurality of tool engaging sections 23A that enable a tool to rotate the cap 20A when threading the cap 20A into or out of an end of a solvent trap 100. The cap 20A includes a projection 24 (shown in FIG. 6) that extends from the head 22A. The projection 24 includes external threads 25 (shown in FIG. 6).

The cap 20B of FIG. 5B includes a second central opening 21B that extends through the cap 20B. The cap 20B includes a head 22B. The head 22B may include a plurality of tool engaging sections 23B that enable a tool to rotate the cap 20B when threading the cap 20B into or out of an end of a solvent trap 100. The cap 20B includes a projection 24 (shown in FIG. 6) that extends from the head 22B. The projection 24 includes external threads 25 (shown in FIG. 6).

Figure 7A:
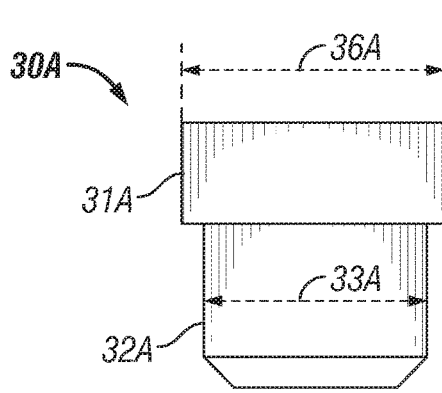
FIGS. 7A and 7B are schematics of an embodiment of a drill bushing.
Figure 7B:
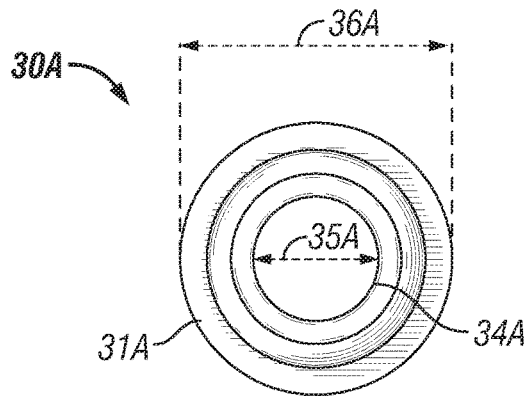

FIGS. 7A and 7B show one embodiment of a drill bushing 30A. The drill bushing 30A includes a head 31A and a projection 32A extending from the head 31A. The head 31A has an outer diameter 35A. The projection 32A of the drill bushing 30A has an outer diameter 33A that is configured to be inserted into a second central opening of a cap 20. For example, the projection 32A may be inserted into the second central opening 21A of cap 20A. The drill bushing 30A includes a third central opening 34A that extends through the drill bushing 30A. The third central opening 34A has an inner diameter 35A that is configured to the passage of a particular round for a firearm. For example, diameter 35A may be configured to permit the passage of a .22 caliber round.

Figure 8A:
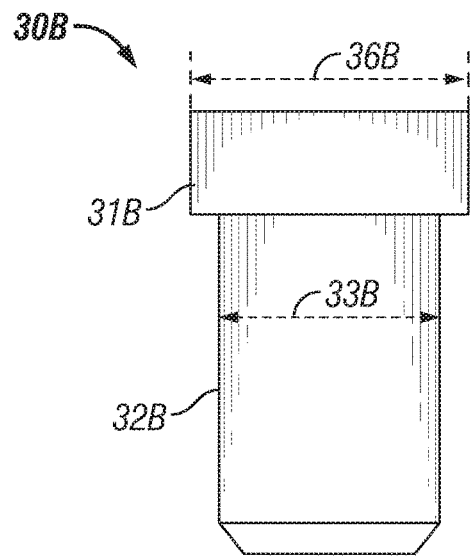
FIGS. 8A and 8B are schematics of an embodiment of a drill bushing.
Figure 8B:
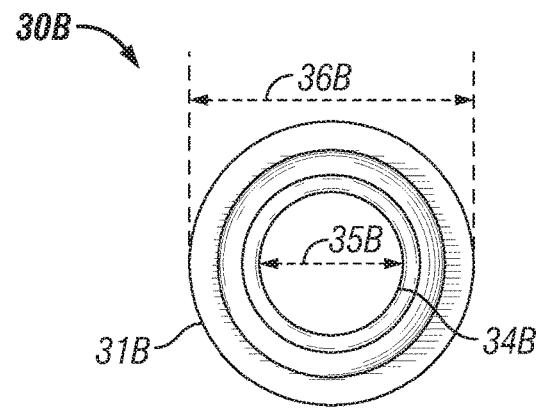

FIGS. 8A and 8B show one embodiment of a drill bushing 30B. The drill bushing 30B includes a head 31B and a projection 32B extending from the head 31B. The head 31B has an outer diameter 35B. The projection 32B of the drill bushing 30B has an outer diameter 33B that is configured to be inserted into a second central opening of a cap 20. For example, the projection 32B may be inserted into the second central opening 21A of cap 20A. The drill bushing 30B includes a third central opening 34B that extends through the drill bushing 30B. The third central opening 34B has an inner diameter 35B that is configured to the passage of a particular firearm round. For example, diameter 35B may be configured to permit the passage of a 5.56 mm round or a 6.5 mm round.

Figure 9A:
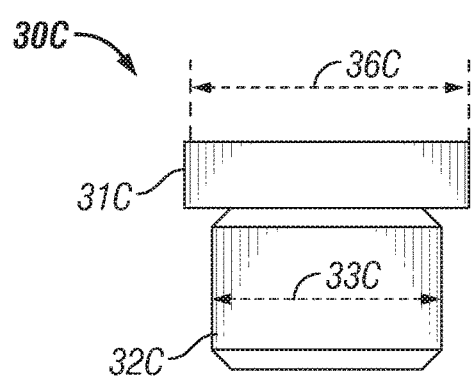
FIGS. 9A and 9B are schematics of an embodiment of a drill bushing.
Figure 9B:
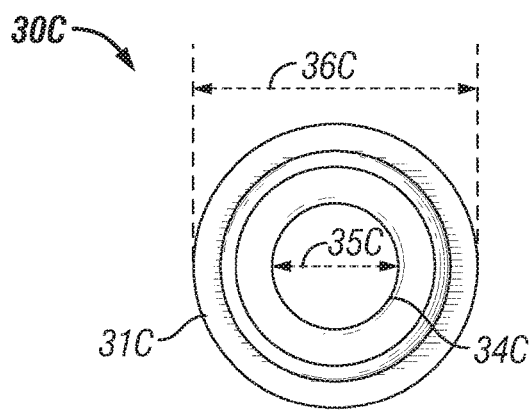

FIGS. 9A and 9B show one embodiment of a drill bushing 30C. The drill bushing 30C includes a head 31C and a projection 32C extending from the head 31C. The head 31C has an outer diameter 35C. The projection 32C of the drill bushing 30C has an outer diameter 33C that is configured to be inserted into a second central opening of a cap 20. For example, the projection 32C may be inserted into the second central opening 21B of cap 20B. The drill bushing 30C includes a third central opening 34C that extends through the drill bushing 30C. The third central opening 34C has an inner diameter 35C that is configured to the passage of a particular firearm round.

Figure 10A:
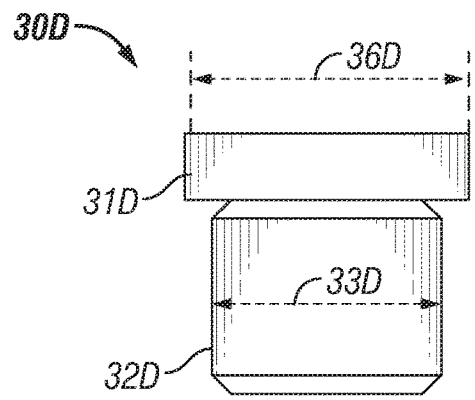
FIGS. 10A and 10B are schematics of an embodiment of a drill bushing.
Figure 10B:
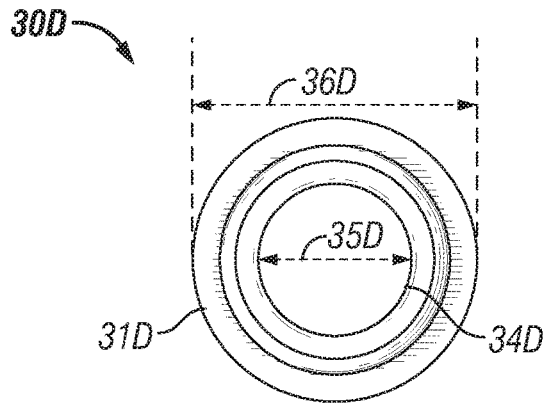

FIGS. 10A and 10B show one embodiment of a drill bushing 30D. The drill bushing 30D includes a head 31D and a projection 32D extending from the head 31D. The head 31D has an outer diameter 35D. The projection 32D of the drill bushing 30D has an outer diameter 33D that is configured to be inserted into a second central opening of a cap 20. For example, the projection 32D may be inserted into the second central opening 21B of cap 20B. The drill bushing 30D includes a third central opening 34D that extends through the drill bushing 30D. The third central opening 34D has an inner diameter 35D that is configured to the passage of a particular firearm round.

Figure 11A:
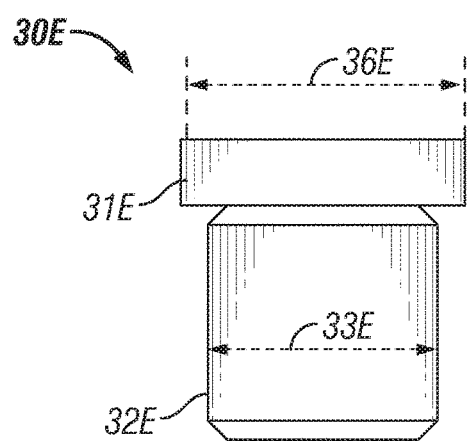
FIGS. 11A and 11B are schematics of an embodiment of a drill bushing.
Figure 11B:
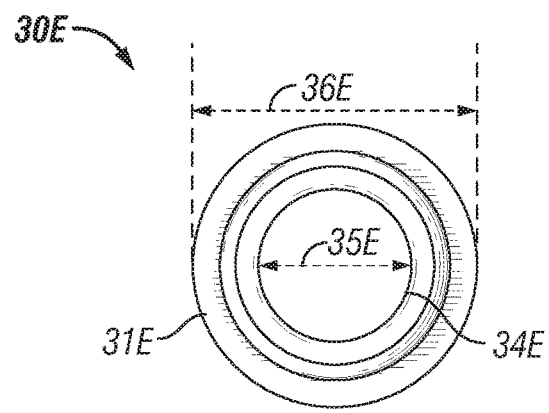

FIGS. 11A and 11B show one embodiment of a drill bushing 30E. The drill bushing 30E includes a head 31E and a projection 32E extending from the head 31E. The head 31E has an outer diameter 35E. The projection 32E of the drill bushing 30E has an outer diameter 33E that is configured to be inserted into a second central opening of a cap 20. For example, the projection 32E may be inserted into the second central opening 21B of cap 20B. The drill bushing 30E includes a third central opening 34E that extends through the drill bushing 30E. The third central opening 34E has an inner diameter 35E that is configured to the passage of a particular firearm round.

Figure 12:
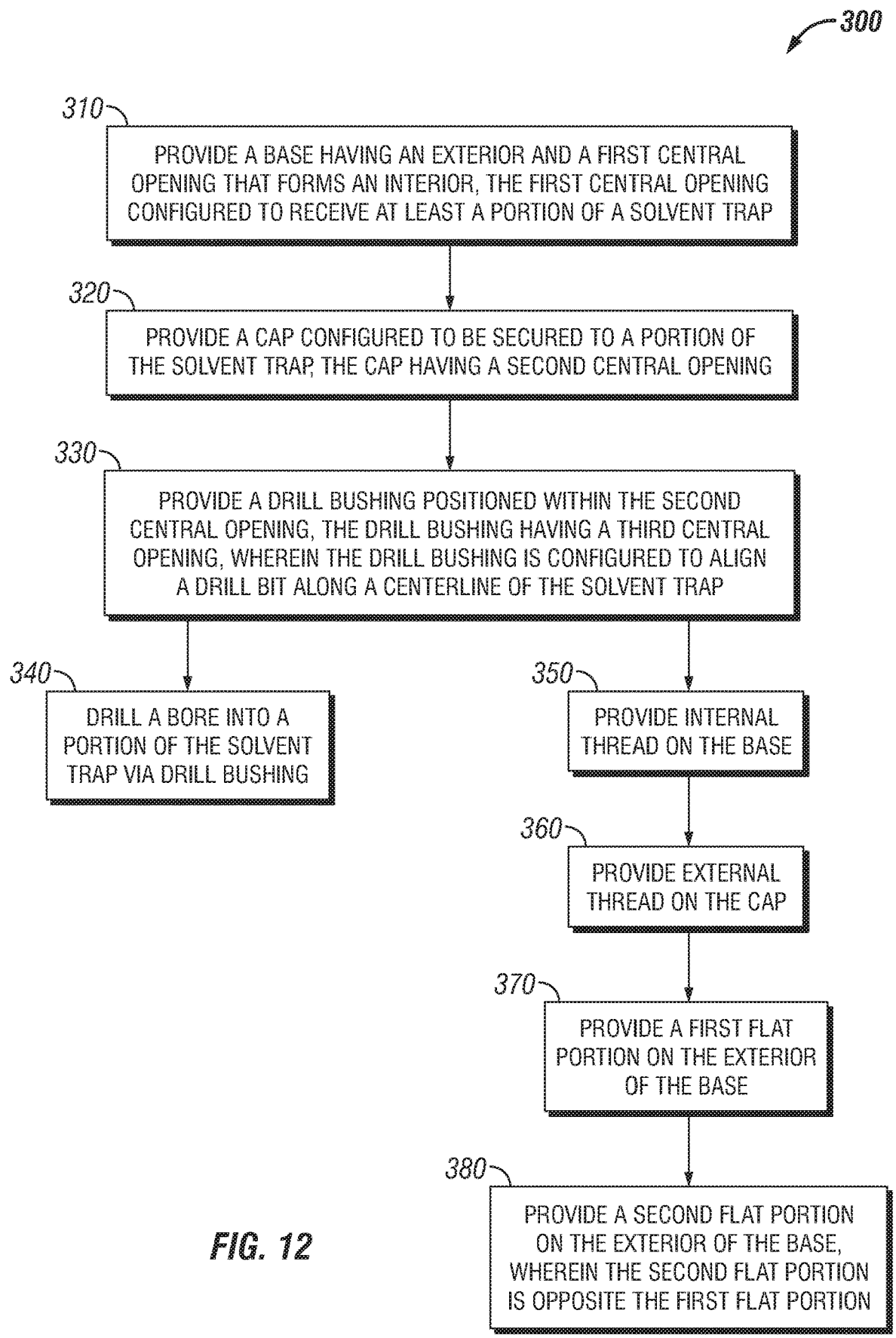
FIG. 12 is a flow chart of an embodiment of a method of the present disclosure.

FIG. 12 is a flow chart of an embodiment of a method 300 of the present disclosure. The method 300 includes providing a base having an exterior and a first central opening that forms an interior, the first central opening configured to receive at least a portion of a solvent trap, at 310. For example, an end of a solvent trap 100 may be inserted into the first central opening 12 of the base 10. Alternatively, an end of a solvent trap 100 may be threaded into the opening 12 of the base 10 via a first set of threads 14. The method 300 includes providing a cap configured to be secured to a portion of the solvent trap, the cap having a second central opening, at 320. For example, a cap 20 may be threaded into an end of a solvent trap 100.

The method 300 includes providing a drill bushing positioned within the second central opening, the drill bushing having a third central opening, wherein the drill bushing is configured to align a drill bit along a centerline of the solvent trap, at 330. The method 300 may include drilling a bore into a portion of the solvent trap via the drill bushing, at 340. For example, a drill bit may be inserted through the drill bushing 30 to engage the solvent trap 100 and drill a bore along the centerline 101 through the solvent trap 100.

The method 300 may include providing internal threads on the base, at 350. The internal threads may be used to engage an end of a solvent trap 100. The method 300 may include providing external threads on the cap, at 360. The external threads may be used to secure a cap 20 to an end of a solvent trap 100. The method 300 may include providing a first flat portion of the exterior of the base, at 370. The method 300 may include providing a second flat portion on the exterior of the base, wherein the second flat portion is opposite the first flat portion, at 380. For example, the base 10 may include first and second flat portions 17, 18 that may enable the base 10 to be held within a tool, such as clamp. The tool may aid in the process or drilling a bore through the solvent trap 100.

Figure 13:
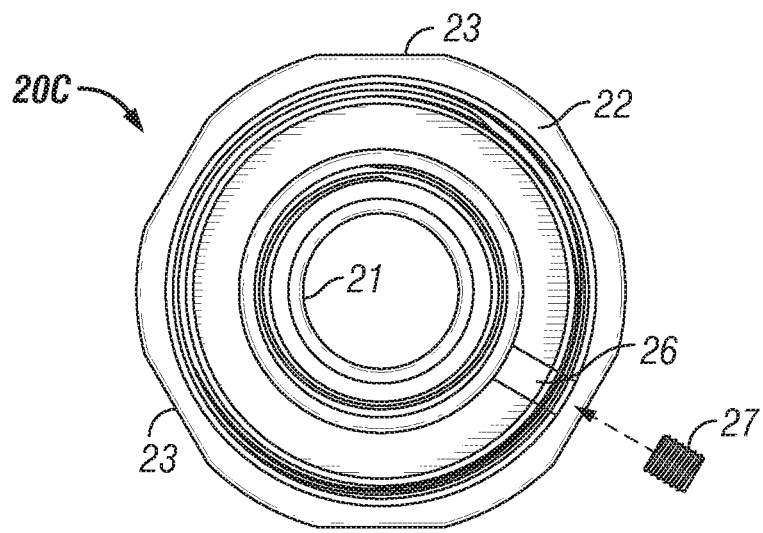
FIG. 13 is a schematic of an embodiment of a cap.
Figure 14:
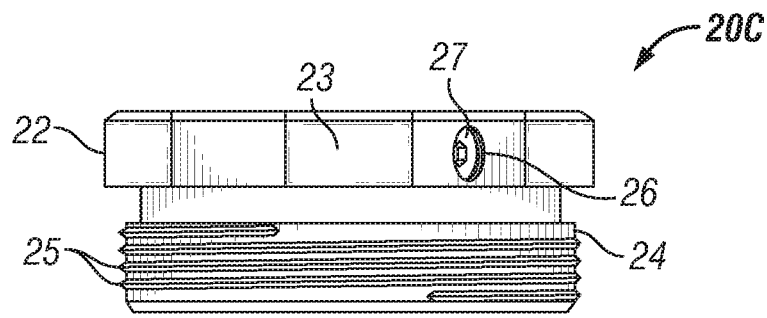
FIG. 14 is a schematic of an embodiment of a cap.

FIG. 13 shows one embodiment of a cap 20C that includes a second central opening 21 that extends through the cap 20C. The cap 20C includes a head 22. The head 22 may include a plurality of tool engaging sections 23 that enable a tool to rotate the cap 20C when threading the cap 20C into or out of an end of a solvent trap 100. The cap 20A includes a projection 24 as shown in FIG. 14 that extends from the head 22. The projection 24 includes external threads 25 that may be used to connect the cap 20C to an end of a solvent trap 100. The cap 20C includes a bore 26 configured to receive a set screw 27. The set screw 27 may be used to retain a drill bushing 30 within the second central opening 21. The set screw 27 may be loosed or removed to enable the drill bushing 30 to be removed and replaced with a second drill bushing 30 that has a different size central opening.

Figure 15:
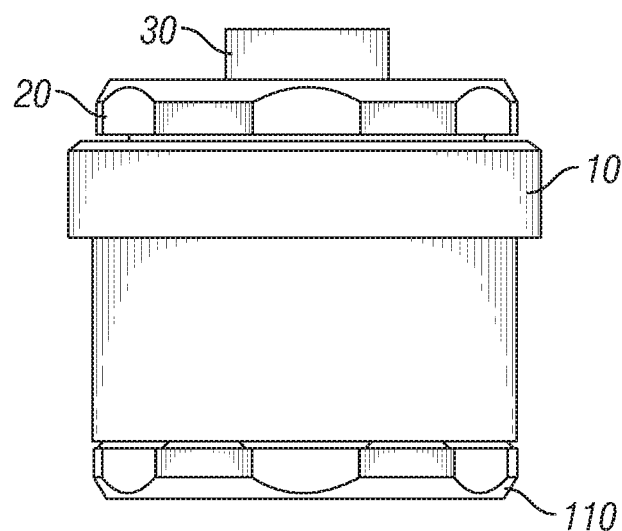
FIG. 15 is a schematic of an embodiment of a base, a cap, and a drill bushing that may be utilized for boring a hole in an end cap of a solvent trap.

FIG. 15 is a schematic of an embodiment of a base 10, a cap 20, and a drill bushing 30 that may be utilized for boring a hole in an end cap 110 of a solvent trap 100. A solvent trap 100 may include an end cap 110 that may be screwed onto the end of the solvent trap 100. The end cap 110 will need to be modified to include a central aperture if the solvent trap 100 is to be converted into a suppressor as discuss herein. The base 10, cap 20, and drill bushing 30 may be used to bore a central opening into the end cap 110. The cap 20 with the drill bushing 30 positioned within the second central opening 21 of the cap 20 will be threaded into one end of the base 10 with the end cap 110 threaded into the other end of the base 10. A drill bit may be inserted through the third central opening of the drill bushing 30 to drill a central bore through the end cap 110. The use of the base 10, cap 20, and drill bushing 30 will ensure that the hole through the end cap 110 is properly aligned along the centerline of the end cap 110.

Figure 16:
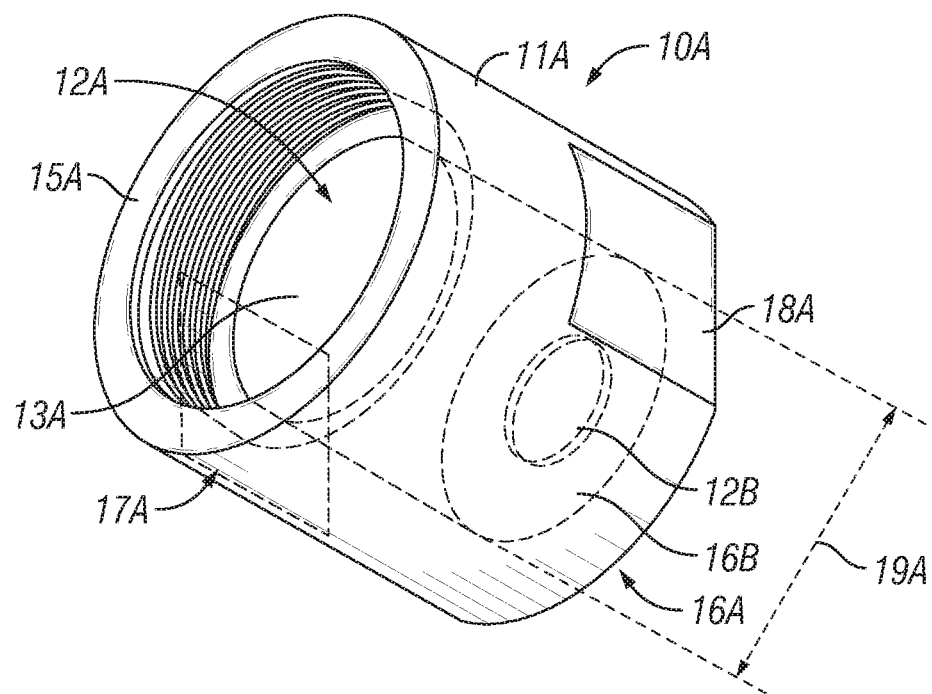
FIG. 16 is a schematic of an embodiment of a base.

FIG. 16 show an embodiment of a base 10A. The base 10A includes an exterior 11A and a first central opening 12A that extends from a first, or top, end 15A of the base 10A to a second, or bottom, end 16A of the base 10. A first central opening 12A in the top 15A of the base 10A forms an interior 13A of the base 10A. The interior 13 of the base 10 includes a first set of threads 14A, which are used to connect a cap 20 to the base 10A. The base 10A is configured so that a single baffle 100A (shown in FIG. 17) may be inserted into the base 10A. A cap 20 that includes a drill bushing 30 may be then screwed onto the base (10A) and a central bore 105A (shown in FIG. 17) may be drilled into the baffle 100A as discussed herein. A bottom interior surface 16B of the base 10A retains the baffle 100A within the base 10A. The bottom interior surface 16B includes an opening or aperture 12B that permits a drill bit to pass through the base when drilling a central bore within a baffle 105A. The base 10A includes a diameter 19A that is configured to permit the insertion of a baffle 100A into the base 10A. For example, the diameter 19A may be substantially the same as the outer diameter of a baffle 100A enabling the baffle 100A to be pressed into the base 100A. Alternatively, the diameter may be slightly larger that the outer diameter of a baffle 100A to enable the baffle 100A to be inserted, but still be aligned with the opening in the drill bushing 30. For example, the diameter 19A may be, but is not limited to, being approximately 0.001 to 0.005 inches larger than the outer diameter of a baffle 100A.

The exterior 11A of the base 10A may be circular to enable the base 10A to be positioned within a lathe, which may be used to drill a bore into a baffle 100A of a solvent trap 100 via the drill bushing 30 as discussed herein. The exterior 11A of the base 10A may include a first flat portion 17A and a second flat portion 18A positioned opposite of the first flat portion 17A. The first and second flat portions 17A, 18A may enable the base 10A to be held by a tool, such as a clamp, to aid in the process or drilling a bore into the baffle 100A of a solvent trap 100. The base 10A may be varied depending on the application as would be appreciated by one of ordinary skill in the art having the benefit of this disclosure. For example, the length of the base 10A may be increased to enable more than one baffle to be inserted into the base 10A.

Figure 17:
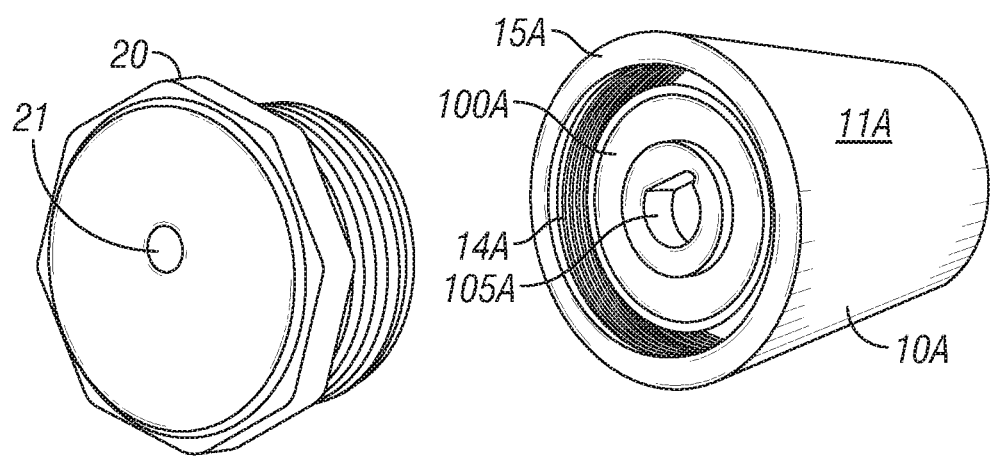
FIG. 17 is a schematic of the embodiment of a base with a baffle from a solvent trap positioned within the base.

FIG. 17 shows a baffle 100A that has been inserted into the base 10A. A drill has been used to bore a central opening 105A through the baffle 100A. A cap 20 having a drill bushing 30 was used to ensure the central opening 105A through the baffle 100A was properly aligned. The cap 20 with the drill bushing 30 has been removed from the base 10A for clarification purposes.

Figure 18:
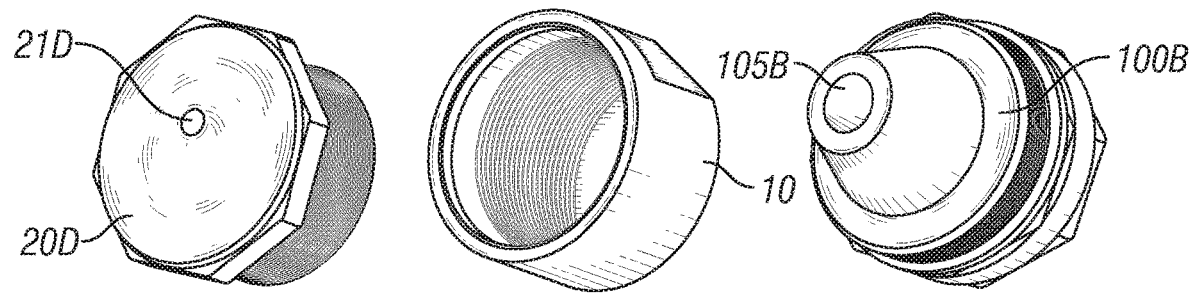
FIG. 18 is a schematic showing an embodiment of a cap, base, and baffle.

The performance of a baffle of a suppressor may be potentially improved if the central opening is clipped. Clipping a baffle is creating enlarging a portion of the central opening of a baffle. For example, a substantially oval shaped opening may be made in the wall of the baffle with the end of the oval shaped opening being connected to a portion of the central opening in a baffle. FIG. 18 shows components of a system that may be used to modify a solvent trap. The system may include a base 10, a cap 20D having an offset opening 21D, and a baffle 100B having a central opening 105B. The system may include a cap 20 having a central opening to first form a central bore through the solvent trap as discussed herein. The cap 20D having an offset opening 21D may be used to clip a baffle of a solvent trap after a central bore has been formed in the solvent trap.

Figure 19:
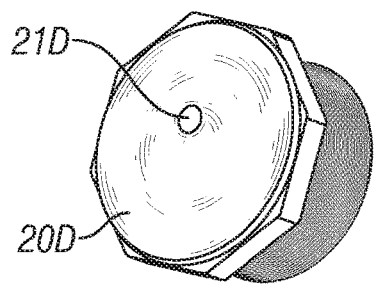
FIG. 19 is a schematic of an embodiment of a cap.

FIG. 19 shows a cap 20D having an offset opening 21D. The size and location of the offset opening 21D is configured such that a drill bit may be inserted through the offset opening 21D to clip one or more baffles 100B. Alternatively, the offset opening 21D may be configured to receive a drill bushing with the drill bushing including an opening to enable a drill bit to be inserted to clip one or more baffles 100B. The system may include a solvent trap and the cap 20D may be configured to be secured to one end of the solvent trap with the base 10 being secured to the other end of the solvent trap. A drill bit may be inserted through the offset opening 21D of the cap 20D to clip baffles within the solvent trap.

Figure 20:
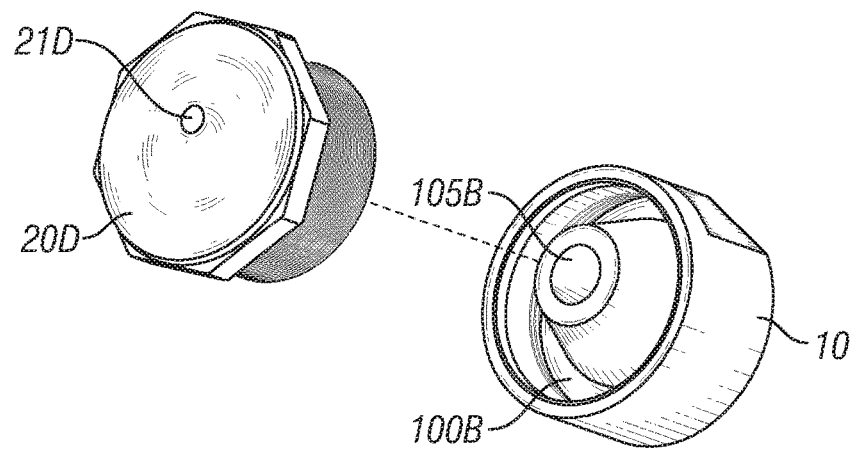
FIG. 20 is a schematic showing a baffle positioned within a base.
Figure 21:
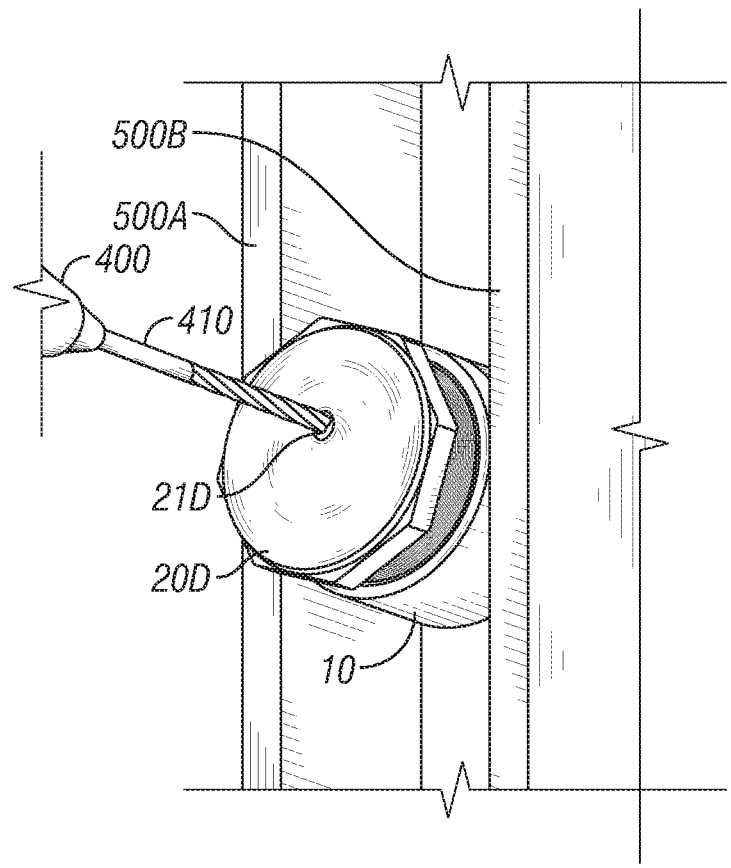
FIG. 21 shows a drill bit being inserted into an offset opening in a cap to clip one or more baffles positioned within a base.
Figure 22:
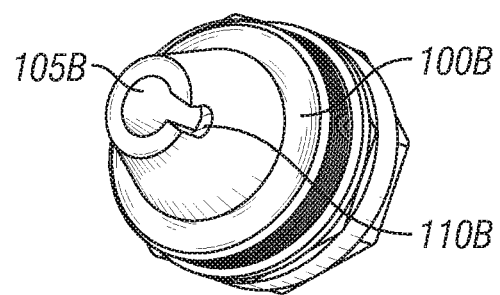
FIG. 22 shows a baffle that has been clipped using a drill inserted through the offset opening in a cap.

FIG. 20 shows the components of FIG. 18 with the baffle 100B positioned within the base 10. The cap 20D may be threaded onto the end of the base 10. FIG. 21 shows a drill bit 410 of a drill 400 being inserted to clip one or more baffles 100B positioned within the base 10. A clamp 500A, 550B may engage first and second flat portions on the exterior of the base 10 to hole the system still while the drill bit 410 clips the one or more baffles 100B positioned within the base 10. The cap 20D and the base 10 may be used to clip baffles 100B within a solvent trap 100 as would be appreciated by one of ordinary skill in the art having the benefit of this disclosure. FIG. 22 shows a baffle 105 with a central hole 105B that has been clipped 110B.

Figure 23:
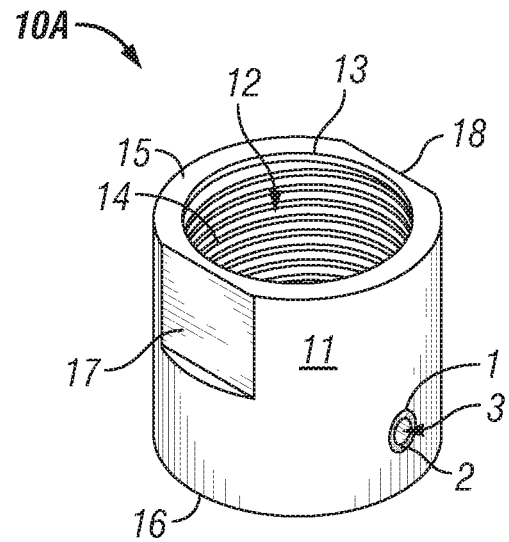
FIG. 23 is a schematic of an embodiment of a base.

FIG. 23 shows an embodiment of a base 10A. The base 10A includes an exterior 11 and a first central opening 12 that extends from a first, or top, end 15 of the base 10A to a second, or bottom, end 16 of the base 10A. The first central opening 12 forms an interior 13 of the base 10A. The interior 13 of the base 10A may include a first set of threads 14, which may be used to connect the base to a portion of a solvent trap 100. Alternatively, an end of a solvent trap 100 may be simply positioned within the first central opening 12 of the base 10A.

The exterior 11 of the base 10A may be circular to enable the base 10A to be positioned within a lathe, which may be used to drill a bore into solvent trap 100 via the drill bushing 30 as discussed herein. The exterior 11 of the base 10A may include a first flat portion 17 and a second flat portion 18 positioned opposite of the first flat portion 17. The first and second flat portions 17, 18 may enable the base 10A to be held by a tool, such as a clamp, to aid in the process or drilling a bore into the solvent trap 100. The base 10A includes an aperture 1 in the exterior of the base 10A. The aperture 1 is located to enable a drill bit may be used to clip a baffle. A drill bushing 2 having a central opening 3 is positioned within the aperture 1.

Figure 24:
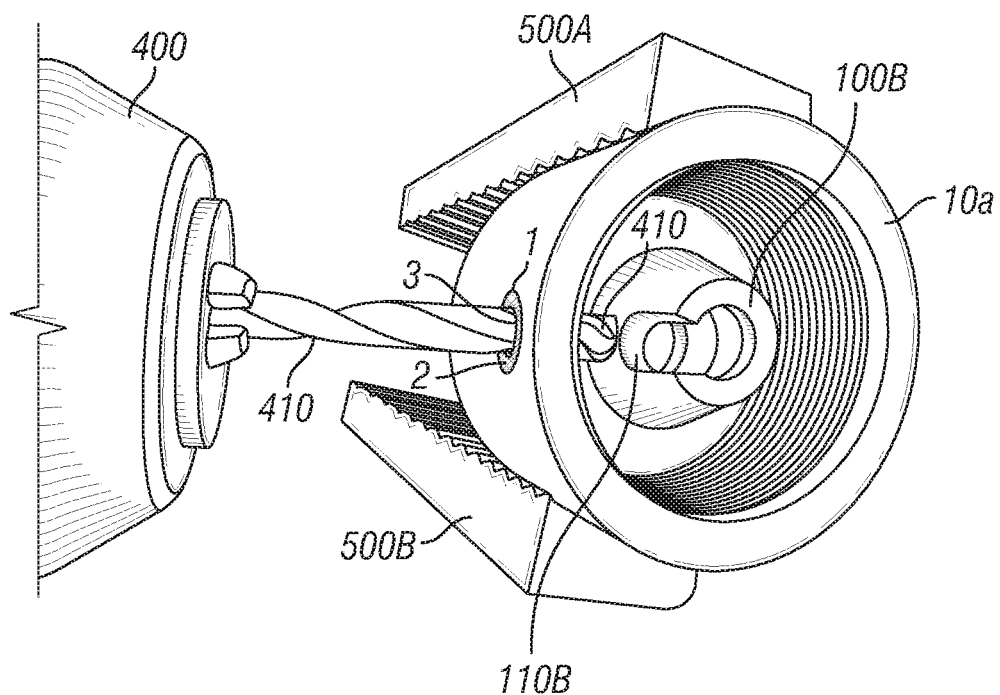
FIG. 24 shows a baffle that has been clipped using a drill inserted through a drill bushing in the cap of FIG. 23.

FIG. 24 is a schematic showing a baffle 100B positioned within the base 10A. The central opening 105B has been clipped 110B by a drill bit 410 of a drill 400 that has been inserted through the opening 3 in the drill bushing 2 inserted into the aperture 1 in the side of the base 10A.

Although this disclosure has been described in terms of certain embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. A system for modifying a solvent trap comprising:
   a base having an exterior and a first central opening that forms an interior, the first central opening configured to receive at least a first portion of a solvent trap;
   a first cap having a second central opening, wherein the second central opening is configured to align a drill bit along a centerline of a solvent trap; and
   a second cap having an offset opening, wherein the offset opening is configured to align a drill bit offset of the centerline of the solvent trap to clip one or more baffles of the solvent trap.

2. The system of claim 1 further comprising a drill bushing positioned within the second central opening, the drill bushing having a third central opening and wherein the drill bushing is configured to align a drill bit along the centerline of the solvent trap.

3. An apparatus for modifying baffles comprising:
   a base having an exterior and a first central opening that forms an interior, the first central opening configured to receive at least a first portion of a solvent trap;
   one or more baffles aligned with the interior of the base; and
   a cap having an offset opening, wherein the offset opening is configured to align a drill bit offset of a centerline of the one or more baffles to clip one or more baffles.

* * * * *